United States Patent
Yang et al.

(10) Patent No.: US 12,136,986 B2
(45) Date of Patent: Nov. 5, 2024

(54) METHOD AND APPARATUS FOR DETERMINING BEAM INFORMATION, AND COMMUNICATIONS DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 484 days.

(21) Appl. No.: 17/493,668

(22) Filed: Oct. 4, 2021

(65) Prior Publication Data

US 2022/0029692 A1   Jan. 27, 2022

Related U.S. Application Data

(63) Continuation of application No. PCT/CN2020/083501, filed on Apr. 7, 2020.

(30) Foreign Application Priority Data

Apr. 8, 2019   (CN) .......................... 201910277981.7

(51) Int. Cl.
   *H04W 24/04*   (2009.01)
   *H04B 7/08*   (2006.01)
   (Continued)

(52) U.S. Cl.
   CPC .......... *H04B 7/0862* (2013.01); *H04L 5/0048* (2013.01); *H04L 5/0094* (2013.01); *H04W 24/04* (2013.01); *H04W 72/044* (2013.01)

(58) Field of Classification Search
   CPC ..... H04L 5/0048; H04L 5/0094; H04L 5/001; H04B 7/0862; H04W 24/04; H04W 72/044
   See application file for complete search history.

(56) References Cited

U.S. PATENT DOCUMENTS

| 11,445,484 B2 | 9/2022 | Qin et al. |
| 2019/0058561 A1 | 2/2019 | Ho et al. |

(Continued)

FOREIGN PATENT DOCUMENTS

| CN | 106507442 A | 3/2017 |
| CN | 107635189 A | 1/2018 |

(Continued)

OTHER PUBLICATIONS

Ericsson., "Remaining issues on beam measurement and reporting," 3GPP TSG-RAN WG1 Meeting #93, Tdoc R1-1806217, pp. 1-13, (May 21, 2018).

(Continued)

*Primary Examiner* — Anez C Ebrahim
(74) *Attorney, Agent, or Firm* — Brooks Kushman P.C.

(57) ABSTRACT

A method and an apparatus for determining beam information, and a communications device are provided. The method for determining beam information is applied to user equipment and includes: determining, based on configuration information of a target communication resource, first information of a source reference signal in a cell and/or BWP in which the target communication resource is located, where the source reference signal is associated with the target communication resource and is located in a different cell and/or BWP from the target communication resource; and determining beam information of the target communication resource based on the first information.

19 Claims, 4 Drawing Sheets

(51) Int. Cl.
*H04L 5/00* (2006.01)
*H04W 72/044* (2023.01)

(56) References Cited

U.S. PATENT DOCUMENTS

| | | | |
|---|---|---|---|
| 2019/0199406 A1 | 6/2019 | Wang et al. | |
| 2019/0373602 A1 | 12/2019 | Qin et al. | |
| 2020/0008245 A1* | 1/2020 | Yan | H04W 36/08 |
| 2020/0059799 A1* | 2/2020 | Suzuki | H04B 7/0628 |
| 2020/0119899 A1 | 4/2020 | Qin et al. | |
| 2020/0267571 A1 | 8/2020 | Park et al. | |
| 2020/0280416 A1 | 9/2020 | Gao et al. | |
| 2021/0168030 A1 | 6/2021 | Li | |
| 2023/0421330 A1* | 12/2023 | Faxér | H04L 5/0057 |

FOREIGN PATENT DOCUMENTS

| | | |
|---|---|---|
| CN | 108024259 A | 5/2018 |
| CN | 108092754 A | 5/2018 |
| CN | 108934019 A | 12/2018 |
| CN | 109076560 A | 12/2018 |
| CN | 109150250 A | 1/2019 |
| CN | 109150272 A | 1/2019 |
| CN | 109150467 A | 1/2019 |
| CN | 109152005 A | 1/2019 |
| EP | 3565170 A1 | 11/2019 |
| WO | 2017148535 A1 | 9/2017 |
| WO | 2018082435 A1 | 5/2018 |
| WO | 2018/137397 A1 | 8/2018 |
| WO | 2018/174803 A1 | 9/2018 |
| WO | 2018228563 A1 | 12/2018 |
| WO | 2019/028765 A1 | 2/2019 |
| WO | 2019/032020 A1 | 2/2019 |
| WO | 2019066618 A1 | 4/2019 |

OTHER PUBLICATIONS

Vivo., "Further discussion on Multi-Beam Operation," 3GPP TSG RAN WG1 #96bis, R1-1904097, pp. 1-7, (Apr. 8, 2019).
CN Office Action dated Oct. 24, 2022 as received in Application No. 201910277981.7.
Written Opinion and International Search Report in Application No. PCT/CN2020/083501 dated Oct. 21, 2021.
European Search Report dated May 11, 2022 as received in application No. 20788417.2.
Vivo "Remaining issues on beam measurement and reporting" 3GPP TSG RAN WG1 Meeting #94 R1-1808221, Aug. 20, 2018.
ZTE "Enhancements on multi-beam operation" 3GPP TSG RAN WG1 Meeting #96bis R1-1904014, Apr. 8, 2019.
Qualcomm Incorporated., "Discussion on QCL," 3GPP TSG RAN WG1 #90, R1-1713414, pp. 1-5, (Aug. 21-25, 2017).
NTT DOCOMO, Inc., "[draft] CR on default PDCCH/PUCCH beam during transition period," 3GPP TSG RAN WG1 Meeting #95, R1-1813299, pp. 1-5, (Nov. 12-16, 2018).
KR Office Action dated Jul. 3, 2023 as received in Application No. 10-2021-7036265.

* cited by examiner

METHOD AND APPARATUS FOR DETERMINING BEAM INFORMATION, AND COMMUNICATIONS DEVICE

CROSS-REFERENCE TO RELATED APPLICATIONS

This application is continuation application of PCT International Application No. PCT/CN2020/083501 filed on Apr. 7, 2020, which claims priority to Chinese Patent Application No. 201910277981.7, filed in China on Apr. 8, 2019, the disclosures of which are incorporated herein by reference in their entireties.

TECHNICAL FIELD

This disclosure relates to the field of wireless communications technologies, and in particular, to a method and an apparatus for determining beam information, and a communications device.

BACKGROUND

In the related art, when the network side configures a channel or reference signal in a cell and/or bandwidth part (BWP), corresponding beam information is usually configured for the channel or reference signal. A transmission configuration indicator (TCI) state is configured for a downlink channel or reference signal, where quasi-colocation (QCL) information includes a BWP-Id (identifier) and a reference signal (source reference signal), and the like. Spatial relation information is configured for an uplink channel or reference signal, including a BWP-Id, a reference signal, and the like.

The following problem exists in the related art: in a case that a reference signal belongs to a different cell and/or BWP from a target channel or reference signal, if a BWP in which the target channel or reference signal is located is an active BWP, measurement on the reference signal located in other BWPs cannot be performed to determine beam information of the reference signal, and therefore beam information of the target channel or reference signal cannot be determined.

SUMMARY

According to a first aspect, an embodiment of this disclosure provides a method for determining beam information, applied to user equipment and including:
  determining, based on configuration information of a target communication resource, first information of a source reference signal in a cell and/or BWP in which the target communication resource is located, where the source reference signal is associated with the target communication resource and is located in a different cell and/or BWP from the target communication resource; and
  determining beam information of the target communication resource based on the first information.

According to a second aspect, an embodiment of this disclosure provides a method for determining beam information, applied to a network-side device and including:
  determining, based on configuration information of a target communication resource, first information of a source reference signal in a cell and/or BWP in which the target communication resource is located, where the source reference signal is associated with the target communication resource and is located in a different cell and/or BWP from the target communication resource; and
  determining beam information of the target communication resource based on the first information.

According to a third aspect, an embodiment of this disclosure provides an apparatus for determining beam information, applied to user equipment and including:
  a determining module, configured to determine, based on configuration information of a target communication resource, first information of a source reference signal in a cell and/or BWP in which the target communication resource is located, where the source reference signal is associated with the target communication resource and is located in a different cell and/or BWP from the target communication resource; and
  a processing module, configured to determine beam information of the target communication resource based on the first information.

According to a fourth aspect, an embodiment of this disclosure provides an apparatus for determining beam information, applied to a network-side device and including:
  a determining module, configured to determine, based on configuration information of a target communication resource, first information of a source reference signal in a cell and/or BWP in which the target communication resource is located, where the source reference signal is associated with the target communication resource and is located in a different cell and/or BWP from the target communication resource; and
  a processing module, configured to determine beam information of the target communication resource based on the first information.

According to a fifth aspect, an embodiment of this disclosure provides a communications device, including a memory, a processor, and a program stored in the memory and capable of running on the processor. When the program is executed by the processor, the steps of the method for determining beam information described above are implemented.

According to a sixth aspect, an embodiment of this disclosure provides a computer-readable storage medium, where a computer program is stored in the computer-readable storage medium, and when the computer program is executed by a processor, the steps of the foregoing method for determining beam information are implemented.

DESCRIPTION OF EMBODIMENTS

Figure 1:
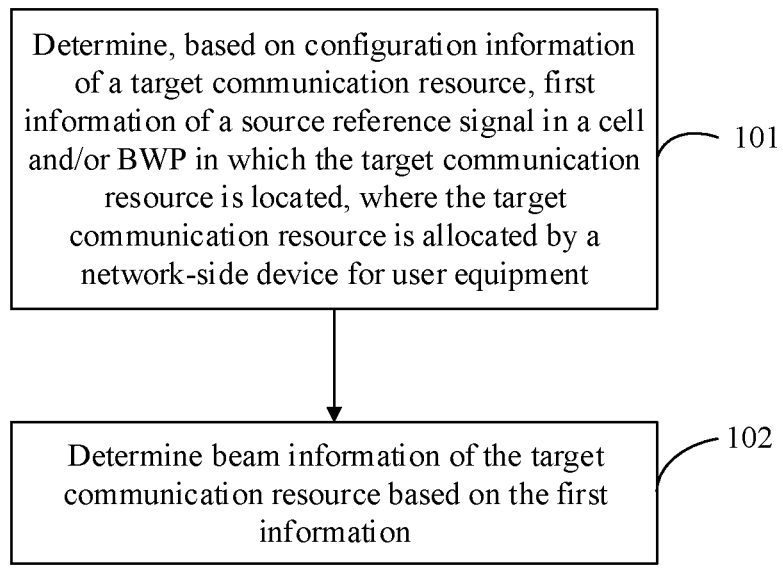
FIG. 1 is a schematic flowchart of a method for determining beam information applied to user equipment according to some embodiments of this disclosure.

To make the objectives, technical solutions, and advantages of this disclosure clearer, the following provides descriptions with reference to accompanying drawings and specific embodiments.

Radio access technology standards such as long term evolution (LTE)/long term evolution advanced (LTE-Advanced, LTE-A) are built based on multiple-input multiple-output (MIMO) and orthogonal frequency division multiplexing (OFDM) technologies. In the MIMO technology, spatial freedom obtained by the multi-antenna system is used to improve the peak rate and system spectrum utilization.

In the process of standardization development, the MIMO technology develops in more dimensions. In LTE release 8, a maximum of four layers can be supported for MIMO transmission. In the enhanced multi-user multiple input multiple output (Multi-User MIMO, MU-MIMO) technology in release 9, a maximum of four downlink data layers can be supported for MU-MIMO transmission in transmission mode (TM) 8. In release 10, the transmission capability in single user multiple input multiple output (Single-User MIMO, SU-MIMO) supports a maximum of eight data layers.

The industry further drives the MIMO technology towards a three-dimensional and massive prospect. The 3GPP has completed a research project of 3D channel modeling, and is working on research and standardization work of enhanced full dimension (eFD)-MIMO and new radio (NR) MIMO. It is predictable that in the future 5G mobile communications system, the massive MIMO technology with more antenna ports is to be introduced.

The massive MIMO technology uses massive antenna arrays to greatly improve utilization of system bands and support a larger quantity of access users. Therefore, major research organizations consider the massive MIMO technology as one of the most promising physical layer technologies in the next-generation mobile communications system.

If an all-digital array is used in the massive MIMO technology, maximized spatial resolution and optimal MU-MIMO performance can be achieved. However, this structure requires a large number of AD (analogy-to-digital)/DA (digital-to-analogy) conversion components and a large number of complete radio frequency-baseband processing channels, imposing a huge burden on both device costs and baseband processing complexity.

In order to avoid the aforementioned implementation costs and device complexity, the digital-analog hybrid beamforming technology emerges, that is, on the basis of conventional digital beamforming, one more stage of beamforming is applied to radio frequency signals near a front end of an antenna system. With analog beamforming, transmit signals and channels can be roughly matched in a relatively simple manner. A dimension of equivalent channels formed through analog beamforming is smaller than an actual quantity of antennas, so that a quantity of required AD/DA converters, a quantity of digital channels, and corresponding baseband processing complexity can be greatly reduced. Residual interference resulting from analog beamforming can be further processed in the digital domain to ensure MU-MIMO transmission quality. Compared with all-digital beamforming, digital-analog hybrid beamforming is a compromise scheme in terms of performance and complexity, and has a higher practical prospect in a high-frequency or large-bandwidth system or a system with a large number of antennas.

In research of next-generation communication systems beyond 4G, an operating band supported by the system is increased to above 6 GHz, even up to about 100 GHz. Relatively abundant idle frequency resources are available in high bands, to provide greater throughput for data transmission. The 3GPP has completed high-frequency channel modeling. High-frequency signals feature short wavelengths, and compared with low bands, for high bands, more antenna array elements can be arranged on an antenna panel of a same size, and beams with greater directivity and narrower lobes are formed by using a beamforming technology. Therefore, combination of massive antennas and high-frequency communication has also become one of the future trends.

Analog beamforming is based on full-bandwidth transmission, and an antenna element of each polarization direction on a panel of each high-frequency antenna array can transmit analog beams only in a time-division multiplexing manner. A beamforming weight of the analog beam is implemented by adjusting parameters of devices such as a phase shifter on the radio frequency front-end.

At present, in the academia and industrial fields, a polling manner is typically used for training of analog beamforming vectors, that is, the antenna element of each polarization direction of each antenna panel sends a training signal (that is, a candidate beamforming vector) sequentially at agreed times in a time-division multiplexing manner. A terminal feeds back a beam report after measurement, so that the network side can use the training signal to implement analog beam transmission for transmitting a next service. Content of the beam report generally includes identifiers of several optimal transmit beams and a measured received power of each transmit beam.

In beam measurement, the network configures an reference signal resource set (RS resource set) that includes at least one reference signal resource, such as an synchronization signal block (SSB) resource or a channel state information reference signal (CSI-RS) resource. User equipment (UE) performs measurement on layer 1-reference signal received power (L1-RSRP) of each RS resource, and reports at least one optimal measurement result to the network. The report content includes synchronization signal block resource index (SSBRI) or channel state information-reference signal resource index (CRI), and L1-RSRP. The report content reflects at least one optimal beam and its quality, so that the network determines a beam used for sending a channel or signal to UE.

In NR release 15, a maximum channel bandwidth of each carrier is 400 MHz. However, considering UE capability, a maximum UE-supported bandwidth may be less than 400 MHz, and UE may also work on a plurality of small BWPs. Each bandwidth part corresponds to one numerology, bandwidth, and frequency location. For a frequency division duplex (FDD) system or a paired spectrum, the base station configures a maximum of four downlink BWPs and a maximum of four uplink BWPs for the UE. For a Time Division Duplexing (TDD) system or an unpaired spectrum, the base station configures a maximum of four DL (downlink)/UL (uplink) BWP pairs for the UE. The DL BWP and the UL BWP in each DL/UL BWP pair have a same center carrier frequency. In addition, each UE has a default DL BWP, or a default DL/UL BWP pair. The default DL BWP or default DL/UL BWP pair is usually a BWP with a relatively small bandwidth. When the terminal fails to receive data or detect the physical downlink control channel (PDCCH) for a long time, the UE is switched from a current active BWP to the default DL BWP or default DL/UL BWP pair by using a timer, to achieve a power saving effect. Active-BWP switching is implemented by using radio resource control (RRC) or downlink control information (DCI) or a timer. For example, DCI on a first control-resource set (CORESET) instructs the terminal to switch to a second CORESET. After the UE is switched to the second CORESET, a BWP in which the CORESET is located is an active BWP. There are a maximum of three CORESETs on each BWP of each cell.

For beam indication of PDCCH, the network uses RRC signaling to configure K TCI (Transmission configuration indicator) states (state) for each CORESET. When K>1, one TCI state is indicated by a media access control (MAC) Control Element (CE) indicates one TCI state. When K=1, no additional MAC CE signaling is required. When listening to a CORESET, the UE uses same QCL information, that is, a same TCI state, for all search spaces within the CORESET. An RS resource (such as a periodic CSI-RS resource, a semi-persistent CSI-RS resource, and an SSB) in an RS set corresponding to the TCI state is spatially QCLed with a UE-specific (specific) PDCCH demodulation reference signal (DMRS) port. The UE may learn, based on the TCI state, which receive beam is used for receiving the PDCCH.

With regard to beam indication for a physical downlink shared channel (PDSCH), the network configures M TCI states by using RRC signaling, activates $2^N$ TCI states by using a MAC CE command, and then notifies the TCI states by using an N-bit TCI field in DCI. An RS resource in an RS set corresponding to the TCI state is QCLed with a DMRS port of the PDSCH to be scheduled. The UE may learn, based on the TCI state, which receive beam is used for receiving the PDSCH.

With regard to beam indication for a physical uplink control channel (PUCCH), the network device configures spatial relation information for each PUCCH resource by using RRC signaling. When spatial relation information configured for a PUCCH resource includes a plurality of entries (entry), spatial relation information of one of the entries is indicated by using a MAC CE. When the spatial relation information configured for the PUCCH resource contains only one entry, no additional MAC CE command is required.

With regard to beam indication for a physical uplink shared channel (PUSCH), the network configures related information of the PUSCH by using RRC signaling. An information element (IE) used for parameter configuration of a UE-specific PUSCH of a specific BWP is PUSCH-Config, including data scrambling information, precoding information, DMRS information, power control information, frequency hopping information, resource allocation information, modulation and coding scheme (MCS) information, resource block group (RBG) information, and the like. An IE used for parameter configuration of a cell-specific PUSCH is PUSCH-ConfigCommon, including: group frequency hopping information, resource allocation information, and so on. In addition, power control information of the PUSCH is also configured. Spatial relation information of a PUSCH indicates that when DCI carried by a PDCCH schedules the PUSCH, each SRI codepoint in an SRI field in the DCI indicates one SRI, and the SRI is used to indicate the spatial relation information of the PUSCH.

In addition, in the foregoing description, the beam may also be referred to as a spatial filter, a spatial domain transmission filter, and so on. The beam information may be referred to as TCI state information, QCL information, spatial relation information, and so on.

In the related art, when the network side configures a channel or reference signal in a cell and/or BWP, corresponding beam information is usually configured for the channel or reference signal. A TCI state (state) is configured for a downlink channel or reference signal, where QCL information includes a BWP-Id (identifier) and a reference signal (source reference signal), and the like. Spatial relation information is configured for an uplink channel or reference signal, including a BWP-Id and a reference signal.

The following problem exists in the related art: in a case that a reference signal belongs to a different cell and/or BWP from a target channel or reference signal, if a BWP in which the target channel or reference signal is located is an active BWP, measurement on the reference signal located in other BWPs cannot be performed to determine beam information of the reference signal, and therefore beam information of the target channel or reference signal cannot be determined.

In order to resolve the foregoing technical problems, an embodiment of this disclosure provides a method and an apparatus for determining beam information, and a communications device, so as to determine beam information of channels or signals in a case that a network-side device configures beam information not for channels or signals in all cells and/or bandwidth parts, thereby reducing signaling overheads for network configuration of beam information.

An embodiment of this disclosure provides a method for determining beam information, applied to user equipment. As shown in FIG. 1, the method includes the following steps.

Step 101: Determine, based on configuration information of a target communication resource, first information of a source reference signal in a cell and/or BWP in which the target communication resource is located, where the source reference signal is associated with the target communication resource and is located in a different cell and/or BWP from the target communication resource.

The target communication resource may be a target reference signal or a target channel. The target communication resource may be a communication resource configured by a network-side device for user equipment, or may be a communication resource specified by the protocol.

The source reference signal may be an SSB, a CSI-RS, or an SRS.

Step 102: Determine beam information of the target communication resource based on the first information.

If the network-side device has configured beam information for the target channel or signal of the user equipment, and a cell and/or BWP in which the source reference signal is located is the same as the cell and/or BWP in which the target channel or signal is located, step 102 does not need to be performed. If the network-side device has configured beam information for the target channel or signal of the user equipment, and the cell and/or BWP in which the source reference signal is located is different from the cell and/or BWP in which the target channel or signal is located, step 102 needs to be performed to obtain resource location information of the source reference signal in the cell and/or BWP in which the target channel or signal is located. If the network-side device does not configure beam information for the target channel or signal of the user equipment, a cell and/or BWP is selected, where beam information has been configured for a channel or signal in the cell and/or BWP;

and then step 102 is performed for a source reference signal of the channel or signal in the cell and/or BWP, so as to obtain resource location information of the source reference signal in the cell and/or BWP in which the target channel or signal is located. Beam information may be configured for only one channel or signal. Other channels or signals in the same cell and/or BWP, or in other cells and/or BWPs, or in the same frequency band, or in a same preset channel or signal group, or for the same user can all use the beam information of the channel or signal, thereby reducing signaling overheads for network configuration of beam information.

In this embodiment, in a case that the source reference signal and the target communication resource allocated by the network-side device are located in different cells and/or BWPs, the first information of the source reference signal in the cell and/or BWP in which the target communication resource is located is determined based on the configuration information of the target communication resource allocated by the network-side device, and the beam information of the target communication resource is determined based on the first information. In this way, for target channels or signals with no beam information configured, resource location information of a source reference signal in a cell and/or BWP in which the target channels or signals is located can be determined based on a source reference signal of other channels or signals, so as to determine beam information of the channels or signals in a case that the network-side device configures beam information not for channels or signals in all cells and/or bandwidth parts, thereby reducing signaling overheads for network configuration of beam information.

Further, the method further includes:
obtaining second information of the source reference signal, where the second information is included in the configuration information of the target communication resource or included in configuration information of other communication resources; where
the determining the first information includes:
determining, based on the second information, the first information of the source reference signal in the cell and/or BWP in which the target communication resource is located.

Specifically, the second information may be located in the beam information under the configuration information.

Specifically, the configuration information may be delivered through RRC signaling by the network-side device such as a base station, and the configuration information includes information about the cell and/or BWP in which the target communication resource such as the target channel or signal is located, for example, a cell index or BWP ID. For at least one cell and/or BWP, the configuration information does not include beam information of the target channel or signal in the cell and/or BWP.

Further, the second information includes at least one of the following:
a resource index of the source reference signal; and
index information of a cell and/or BWP in which the source reference signal is located.

Further, the method further includes:
obtaining third information of the source reference signal, where the third information includes time domain and/or frequency domain information of the source reference signal; where
the determining the first information includes:
determining, based on the second information and the third information, the first information of the source reference signal in the cell and/or BWP in which the target communication resource is located.

Further, the time domain information includes a start point of a time domain resource and a quantity of time domain resources; and the frequency domain information includes a start point of the frequency domain resource and a quantity of frequency domain resources.

The foregoing resource includes but is not limited to a resource block.

Further, in a case that the source reference signal is a downlink reference signal, the determining beam information of the target communication resource based on the first information includes:
in the cell and/or BWP in which the target communication resource is located, performing beam measurement on the source reference signal based on the first information, and sending a beam measurement report to a network-side device.

Further, in a case that the source reference signal is an uplink reference signal, the determining beam information of the target communication resource based on the first information includes:
sending the source reference signal to a network-side device in the cell and/or BWP in which the target communication resource is located.

Further, the configuration information includes a plurality of candidate source reference signals, and the method further includes:
determining one source reference signal in the plurality of candidate source reference signals as a source reference signal associated with the target communication resource based on a media access control control element (MAC CE) command and/or downlink control information (DCI) of the network-side device, where, when the network-side device configures a plurality of pieces of beam information for the target channel or signal, the network-side device uses the MAC CE command to indicate one piece of beam information of the target channel or signal to the user equipment.

Further, after the determining the beam information of the target communication resource, the method further includes:
determining a transmit beam or receive beam of the target communication resource based on the beam information.

Further, the configuration information includes information about the cell and/or BWP in which the target communication resource is located.

Further, the information about the cell and/or BWP in which the target communication resource is located includes at least one of the following:
index information of the cell and/or BWP;
a start point of a time domain resource and a quantity of time domain resources in the cell and/or BWP; and
a start point of a frequency domain resource and a quantity of frequency domain resources in the cell and/or BWP.

The foregoing resource includes but is not limited to a resource block.

Further, the source reference signal includes at least one of the following: a synchronization signal block, a channel state information reference signal, and a sounding reference signal.

Further, the first information includes resource information of the source reference signal in the cell and/or BWP in which the target communication resource is located, and the configuration information includes a resource quantity A and a resource start position B that are of the source reference signal; and the determining, based on configuration information of a target communication resource, first information of a source reference signal in a cell and/or bandwidth part (BWP) in which the target communication resource is located includes:

if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and if A is greater than $S+N_{start}-C$, determining a quantity D of resources of the source reference signal in the cell and/or BWP in which the target communication resource is located to be $S+N_{start}-C$; otherwise, determining D to be equal to A, where S is a quantity of resources of the cell and/or BWP in which the target communication resource is located.

The foregoing resource includes but is not limited to a resource block.

Further, the first information includes frequency domain information of the source reference signal in the cell and/or BWP in which the target communication resource is located, and the determining, based on configuration information of a target communication resource, first information of a source reference signal in a cell and/or bandwidth part (BWP) in which the target communication resource is located includes:

in a case that a frequency domain start position $N_{start}$ of the cell and/or BWP in which the target communication resource is located is less than or equal to a preset frequency domain offset, determining a frequency domain start position of the source reference signal in the cell and/or BWP in which the target communication resource is located to be a subcarrier 0 of a common resource; otherwise, determining the frequency domain start position of the source reference signal in the cell and/or BWP in which the target communication resource is located to be a lowest subcarrier of the cell and/or BWP in which the target communication resource is located, where the lowest subcarrier is a subcarrier with a lowest frequency in the subcarriers.

The foregoing resource includes but is not limited to a resource block.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:

a source reference signal in the beam information of the target communication resource configured by the network-side device;

a source reference signal in beam information of other communication resources located in the same cell and/or BWP as the target communication resource;

a source reference signal in beam information of other communication resources located in a different cell and/or BWP from the target communication resource;

a common source reference signal in a preset communication resource group to which the target communication resource belongs;

a source reference signal in beam information of other communication resources belonging to a preset communication resource group as the target communication resource;

a source reference signal in beam information of other communication resources located in the same band as the target communication resource; and a source reference signal in beam information of other communication resources corresponding to same user equipment as the target communication resource.

The preset communication resource group may be a group of communication resources that are configured by the network-side device or specified by the protocol. For example, the network-side device may allocate a preset communication resource group to the user equipment, and configure a common source reference signal for the preset communication resource group, where communication resources in the preset communication resource group all use the common source reference signal. Alternatively, the network-side device may configure a source reference signal separately for the communication resources in the preset communication resource group, where a target communication resource with no source reference signal configured may use a source reference signal of the communication resource, configured with the source reference signal, in the same preset communication resource group.

The communication resource corresponding to the source reference signal used by the target communication resource may be referred to as a first communication resource, and the source reference signal used by the target communication resource is a source reference signal that is configured by the network-side device for the first communication resource. The first communication resource may be one or more communication resources in all communication resources in the same cell and/or BWP, or in different cells and/or BWPs, or in the same preset communication resource group, or in the same frequency band, or corresponding to the same user equipment, where the one or more communication resources are configured with a source reference signal and are different from the target communication resource. When there is only one other communication resource, the only one other communication resource may be used as the first communication resource. When there are more than one other communication resource, the user equipment may select the first communication resource based on an indication of the network-side device or stipulation of the protocol, and use the source reference signal of the selected first communication resource. A type of the first communication resource may be the same as or different from a type of the target communication resource, and the type of the communication resource includes a channel type or a reference signal type, for example, a channel such as PDCCH, PDSCH, PUCCH, or PUSCH, and a reference signal such as CSI-RS, SSB, or SRS. Selecting the first communication resource may be implemented in at least one of the following manners:

the network-side device directly indicates using a communication resource as the first communication resource;

based on the stipulation of the protocol or the indication of the network-side device, a communication resource of the same type as the target communication resource is preferentially selected as the first communication resource;

based on the stipulation of the protocol or the indication of the network-side device, a communication resource of a specific type is preferentially selected as the first communication resource;

based on the stipulation of the protocol or the indication of the network-side device, a communication resource with a specific resource index is preferentially selected as the first communication resource;

based on the stipulation of the protocol or the indication of the network-side device, a communication resource with a specific cell and/or BWP index in the cell and/or BWP is preferentially selected as the first communication resource;

based on the stipulation of the protocol or the indication of the network-side device, a communication resource with specific transmission behavior (including periodic, semi-persistent, and aperiodic transmission) is preferentially selected as the first communication resource; and based on the stipulation of the protocol or the indication of the network-side device, a communication resource with a highest priority is used as the first communication resource.

The priority mentioned herein includes but is not limited to: a priority of the type of communication resource, a priority of the resource index of the communication resource (for example, the communication resource with the specific resource index has a higher priority), a priority of the cell and/or BWP in which the communication resource is located, a priority of time domain transmission behavior of the communication resources, and the like.

Further, the cell and/or BWP includes at least one of the following:

a downlink cell and/or downlink BWP in frequency division duplex mode;

an uplink cell and/or uplink BWP in frequency division duplex mode;

a downlink cell and/or downlink BWP in time division duplex mode; and an uplink cell and/or uplink BWP in time division duplex mode.

Figure 2:
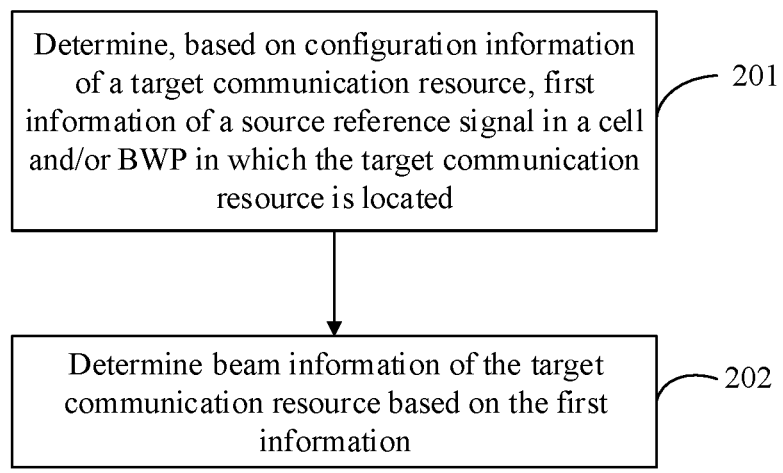
FIG. 2 is a schematic flowchart of a method for determining beam information applied to a network-side device according to some embodiments of this disclosure.

Some embodiments of this disclosure further provide a method for determining beam information, applied to a network-side device. As shown in FIG. 2, the method includes the following steps.

Step 201: Determine, based on configuration information of a target communication resource, first information of a source reference signal in a cell and/or BWP in which the target communication resource is located, where the source reference signal is associated with the target communication resource and is located in a different cell and/or BWP from the target communication resource.

The target communication resource may be a communication resource configured by a network-side device for user equipment, or may be a communication resource specified by the protocol.

Step 202: Determine beam information of the target communication resource based on the first information.

In this embodiment, in a case that the source reference signal and the target communication resource allocated by the network-side device are located in different cells and/or BWPs, the first information of the source reference signal in the cell and/or BWP in which the target communication resource is located is determined based on the configuration information of the target communication resource allocated by the network-side device, and the beam information of the target communication resource is determined based on the first information. In this way, for target channels or signals with no beam information configured, resource location information of a source reference signal in a cell and/or BWP in which the target channels or signals is located can be determined based on a source reference signal of other channels or signals, so as to determine beam information of the channels or signals in a case that the network-side device configures beam information not for channels or signals in all cells and/or bandwidth parts, thereby reducing signaling overheads for network configuration of beam information.

Further, the determining the first information includes:

determining, based on second information of the source reference signal, the first information of the source reference signal in the cell and/or BWP in which the target communication resource is located, where the second information is included in the configuration information of the target communication resource or included in configuration information of other communication resources.

Further, the second information includes at least one of the following:

a resource index of the source reference signal; and index information of a cell and/or BWP in which the source reference signal is located.

Further, the determining the first information includes:

determining, based on the second information and third information of the source reference signal, the first information of the source reference signal in the cell and/or BWP in which the target communication resource is located, where the third information includes time domain and/or frequency domain information of the source reference signal.

Further, the time domain information includes a start point of a time domain resource and a quantity of time domain resources; and the frequency domain information includes a start point of the frequency domain resource and a quantity of frequency domain resources.

The foregoing resource includes but is not limited to a resource block.

Further, in a case that the source reference signal is an uplink reference signal, the determining beam information of the target communication resource based on the first information includes:

in the cell and/or BWP in which the target communication resource is located, performing beam measurement on the source reference signal based on the first information, and determining the beam information of the target communication resource based on a beam measurement result.

Further, in a case that the source reference signal is a downlink reference signal, the determining beam information of the target communication resource based on the first information includes:

in the cell and/or BWP in which the target communication resource is located, sending the source reference signal to user equipment based on the first information, and receiving a beam measurement report sent by the user equipment.

Further, the configuration information includes a plurality of candidate source reference signals, and the method further includes:

indicating, to user equipment, one source reference signal in the plurality of candidate source reference signals as a source reference signal associated with the target communication resource by using a media access control control element (MAC CE) command and/or downlink control information (DCI).

Further, the configuration information includes information about the cell and/or BWP in which the target communication resource is located.

Further, the information about the cell and/or BWP in which the target communication resource is located includes at least one of the following:
- index information of the cell and/or BWP;
- a start point of a time domain resource and a quantity of time domain resources in the cell and/or BWP; and
- a start point of a frequency domain resource and a quantity of frequency domain resources in the cell and/or BWP.

The foregoing resource includes but is not limited to a resource block.

Further, the source reference signal includes at least one of the following: a synchronization signal block, a channel state information reference signal, and a sounding reference signal.

Further, the first information includes resource information of the source reference signal in the cell and/or BWP in which the target communication resource is located, and the configuration information includes a resource quantity A and a resource start position B that are of the source reference signal; and the determining, based on configuration information of a target communication resource, first information of a source reference signal in a cell and/or bandwidth part (BWP) in which the target communication resource is located includes:
- if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and
- if A is greater than $S+N_{start}-C$, determining a quantity D of resources of the source reference signal in the cell and/or BWP in which the target communication resource is located to be $S+N_{start}-C$; otherwise, determining D to be equal to A, where S is a quantity of resources of the cell and/or BWP in which the target communication resource is located.

Further, the first information includes frequency domain information of the source reference signal in the cell and/or BWP in which the target communication resource is located, and the determining, based on configuration information of a target communication resource, first information of a source reference signal in a cell and/or bandwidth part (BWP) in which the target communication resource is located includes:
- in a case that a frequency domain start position $N_{start}$ of the cell and/or BWP in which the target communication resource is located is less than or equal to a preset frequency domain offset, determining a frequency domain start position of the source reference signal in the cell and/or BWP in which the target communication resource is located to be a subcarrier 0 of a common resource; otherwise, determining the frequency domain start position of the source reference signal in the cell and/or BWP in which the target communication resource is located to be a lowest subcarrier of the cell and/or BWP in which the target communication resource is located.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:
- a source reference signal in the beam information of the target communication resource configured by the network-side device;
- a source reference signal in beam information of other communication resources located in the same cell and/or BWP as the target communication resource;
- a source reference signal in beam information of other communication resources located in a different cell and/or BWP from the target communication resource;
- a common source reference signal in a preset communication resource group to which the target communication resource belongs;
- a source reference signal in beam information of other communication resources belonging to a preset communication resource group as the target communication resource;
- a source reference signal in beam information of other communication resources located in the same band as the target communication resource; and
- a source reference signal in beam information of other communication resources corresponding to same user equipment as the target communication resource.

Further, the cell and/or BWP includes at least one of the following:
- a downlink cell and/or downlink BWP in frequency division duplex mode;
- an uplink cell and/or uplink BWP in frequency division duplex mode;
- a downlink cell and/or downlink BWP in time division duplex mode; and
- an uplink cell and/or uplink BWP in time division duplex mode.

The technical solutions of this disclosure are further described below with reference to specific embodiments.

Embodiment 1

It is assumed that the target channel or signal is a PUCCH, and the reference signal is a CSI-RS.

(1) The network-side device configures, for the UE through RRC signaling, the PUCCH, including an ID of an uplink BWP in which the PUCCH is located.

The spatial relation information (beam information) of the PUCCH resource is configured not for all uplink BWPs, and the spatial relation information of the PUCCH is not configured for at least one uplink BWP. For example:
- PUCCH resource 1 is configured in BWP 1 and is configured with spatial relation; a reference signal of PUCCH resource 1 is CSI-RS resource 1, and a BWP in which CSI-RS resource 1 is located is BWP 1;
- PUCCH resource 2 is configured in BWP 2 and is configured with spatial relation; a reference signal of PUCCH resource 2 is CSI-RS resource 1, and a BWP in which CSI-RS resource 1 is located is BWP 1; and
- PUCCH resource 3 is configured on BWP 3 but is configured with no spatial relation.

(2) In a case that PUCCH spatial relation information is configured on the current BWP (or active BWP, or BWP in which the PUCCH is located):

a. Same as the foregoing PUCCH resource 1, both a reference signal of PUCCH resource 1 and the PUCCH resource 1 are located in BWP 1.

1. On BWP 1, through beam measurement on CSI-RS resource 1, the UE obtains beam information of CSI-RS resource 1, that is, QCL information.
2. Because CSI-RS resource 1 is a reference signal of PUCCH resource 1, spatial relation information of PUCCH resource 1 can be determined.
  b. Same as the foregoing PUCCH resource 2, a reference signal of PUCCH resource 2 and the PUCCH resource 2 are located in different BWPs, that is, the PUCCH resource 2 is in BWP 2, and the reference signal of PUCCH resource 2 is in BWP 1.
1. Location information of CSI-RS resource 1 on BWP 2 is determined based on location information of CSI-RS resource 1 in BWP 1, information of BWP 2, and the like.
2. On BWP 2, through beam measurement on CSI-RS resource 1, the UE obtains beam information of CSI-RS resource 1, that is, QCL information.
3. Because CSI-RS resource 1 is a reference signal of PUCCH resource 2, spatial relation information of PUCCH resource 2 can be determined.
  (3) is contrary to (2). In a case that PUCCH spatial relation information is not configured:
  a. Same as the foregoing PUCCH resource 3, spatial relation information of PUCCH resource 3 is not configured on BWP 3.
1. The reference signal of PUCCH resource 1, namely CSI-RS resource 1, is selected as the reference signal of PUCCH resource 3.
2. Location information of CSI-RS resource 1 on BWP 3 is determined based on location information of CSI-RS resource 1 in BWP 1, information of BWP 3, and the like.
3. On BWP 3, through beam measurement on CSI-RS resource 1, the UE obtains beam information of CSI-RS resource 1, that is, QCL information.
  Because CSI-RS resource 1 is determined the reference signal of PUCCH resource 3, the spatial relation information of PUCCH resource 3 can be determined.
  (4) For a PUCCH resource configured with a plurality of pieces of spatial relation information, the network-side device uses a MAC CE command to indicate one piece of PUCCH spatial relation information.
  (5) The UE uses one piece of PUCCH spatial relation information indicated by the network to determine a transmit beam of the PUCCH.

Embodiment 2

On the basis of Embodiment 1, the PUCCH may be replaced by other channels or signals, such as a PDCCH. If the target channel or signal is a downlink channel or signal, the spatial relation information is replaced by TCI state information or QCL information.

For embedded BWPs (which are two overlapping BWP resources), a first BWP is included in a second BWP. In a case that a reference signal is on the first BWP and a target channel or signal is on the second BWP, resource location information of the reference signal on the two BWPs does not need to be determined. In a case that the reference signal is on the second BWP and does not belong to the first BWP, and the target channel or signal is on the first BWP, resource location information of the reference signal on the first BWP needs to be determined according to the technical solution of this disclosure.

Embodiment 3

In a case that the source reference signal is a CSI-RS, the resource location information of the source reference signal in the cell and/or BWP in which the target signal or channel is located may be determined in the following manners:
  if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and
  if A is greater than $S+N_{start}-C$, determining a quantity D of resources of the source reference signal in the cell and/or BWP in which the target communication resource is located to be $S+N_{start}-C$; otherwise, determining D to be equal to A, where A is a quantity of resources of the source reference signal, B is a start position of the resources of the source reference signal, and S is a quantity of resources of the cell and/or BWP in which the target signal or channel is located.

Specifically, in a case that the source reference signal is a CSI-RS, the resource location information of the source reference signal in the cell and/or BWP in which the target signal or channel is located may be determined in the following manners: if startingRB<$N_{BWP}^{start}$, a resource start position of the CSI-RS is $N_{initialRB}=N_{BWP}^{start}$; otherwise, $N_{initialRB}$=startingRB, where startingRB is a resource start position (a position of a start resource block RB) of the CSI-RS, and $N_{BWP}^{start}$ is a resource start position (a position of a start resource block RB) of the BWP; and
  if nrofRBs>$N_{BWP}^{size}+N_{BWP}^{start}-N_{initialRB}$, a quantity $N_{CSI-RS}^{BW}$ of resources (a quantity of resource blocks RBs) of the CSI-RS in the BWP in which the target communication resource is located is $N_{BWP}^{size}+N_{BWP}^{start}-N_{initial\ RB}$; otherwise, $N_{CSI-RS}^{BW}$=nrofRBs, where nrofRBs is a quantity of resources (a quantity of resource blocks RBs) of the CSI-RS, and $N_{BWP}^{size}$ is a size of the BWP, that is, a quantity of resources (a quantity of resource blocks RBs) included in the BWP; where $$N_{CSI-RS}^{BW} \leq \min(24, N_{BWP}^{size}).$$

In a case that the source reference signal is an SRS, the resource location information of the source reference signal in the cell and/or BWP in which the target signal or channel is located may be determined in the following manners:
  in a case that a frequency domain start position $N_{start}$ of the cell and/or BWP in which the target signal or channel is located is less than or equal to a preset frequency domain offset, a frequency domain start position of the source reference signal in the cell and/or BWP in which the target signal or channel is located is a subcarrier 0 of a common resource; otherwise, the frequency domain start position of the source reference signal in the cell and/or BWP in which the target signal or channel is located is a lowest subcarrier of the cell and/or BWP in which the target signal or channel is located.

Specifically, in the case that the source reference signal is an SRS, if $N_{BWP}^{start} \leq n_{shift}$, a frequency domain start position (a start subcarrier position) of the SRS in the BWP in which the target communication resource is located is a subcarrier 0 of a common resource; otherwise, the frequency domain start position of the SRS is a lowest subcarrier of the BWP in which the target communication resource is located, where the lowest subcarrier is a subcarrier with a lowest frequency in subcarriers included in the BWP.

Figure 3:
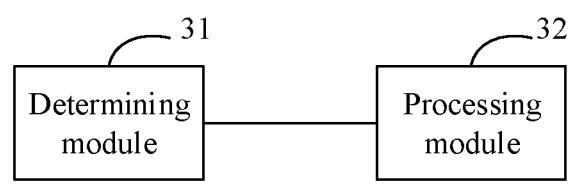
FIG. 3 is a structural block diagram of an apparatus for determining beam information applied to user equipment according to some embodiments of this disclosure.

Some embodiments of this disclosure further provide an apparatus for determining beam information, applied to user equipment. As shown in FIG. 3, the apparatus includes:
- a determining module 31, configured to determine, based on configuration information of a target communication resource, first information of a source reference signal in a cell and/or BWP in which the target communication resource is located, where the source reference signal is associated with the target communication resource and is located in a different cell and/or BWP from the target communication resource; and
- a processing module 32, configured to determine beam information of the target communication resource based on the first information.

In this embodiment, in a case that the source reference signal and the target communication resource allocated by the network-side device are located in different cells and/or BWPs, the first information of the source reference signal in the cell and/or BWP in which the target communication resource is located is determined based on the configuration information of the target communication resource allocated by the network-side device, and the beam information of the target communication resource is determined based on the first information. In this way, for target channels or signals with no beam information configured, resource location information of a source reference signal in a cell and/or BWP in which the target channels or signals is located can be determined based on a source reference signal of other channels or signals, so as to determine beam information of the channels or signals in a case that the network-side device configures beam information not for channels or signals in all cells and/or bandwidth parts, thereby reducing signaling overheads for network configuration of beam information.

Further, the apparatus further includes:
- a receiving module, configured to obtain second information of the source reference signal, where the second information is included in the configuration information of the target communication resource or included in configuration information of other communication resources; where
- the determining module is specifically configured to determine, based on the second information, the first information of the source reference signal in the cell and/or BWP in which the target communication resource is located.

Further, the second information includes at least one of the following:
- a resource index of the source reference signal; and
- index information of a cell and/or BWP in which the source reference signal is located.

The receiving module is further configured to obtain third information of the source reference signal, where the third information includes time domain and/or frequency domain information of the source reference signal; where
- the determining module is specifically configured to determine, based on the second information and the third information, the first information of the source reference signal in the cell and/or BWP in which the target communication resource is located.

Further, the time domain information includes a start point of a time domain resource and a quantity of time domain resources; and the frequency domain information includes a start point of the frequency domain resource and a quantity of frequency domain resources.

Further, in a case that the source reference signal is a downlink reference signal, the processing module 32 is specifically configured to: in the cell and/or BWP in which the target communication resource is located, perform beam measurement on the source reference signal based on the first information, and send a beam measurement report to a network-side device.

Further, in a case that the source reference signal is an uplink reference signal, the processing module 32 is specifically configured to send the source reference signal to a network-side device in the cell and/or BWP in which the target communication resource is located.

Further, the configuration information includes a plurality of candidate source reference signals, and the apparatus further includes:
- a selection module, configured to determine one source reference signal in the plurality of candidate source reference signals as a source reference signal associated with the target communication resource based on a media access control control element (MAC CE) command and/or downlink control information (DCI) of the network-side device.

Further, after the beam information of the target communication resource is determined, the processing module 32 is further configured to: determine a transmit beam or receive beam of the target communication resource based on the beam information.

Further, the configuration information includes information about the cell and/or BWP in which the target communication resource is located.

Further, the information about the cell and/or BWP in which the target communication resource is located includes at least one of the following:
- index information of the cell and/or BWP;
- a start point of a time domain resource and a quantity of time domain resources in the cell and/or BWP; and
- a start point of a frequency domain resource and a quantity of frequency domain resources in the cell and/or BWP.

Further, the source reference signal includes at least one of the following: a synchronization signal block, a channel state information reference signal, and a sounding reference signal.

The first information includes resource information of the source reference signal in the cell and/or BWP in which the target communication resource is located, and the configuration information includes a resource quantity A and a resource start position B that are of the source reference signal; and the determining module 31 is specifically configured to:
- if B is less than a resource start position $N_{start}$ of the cell and/or BWP in which the target communication resource is located, determine a resource start position C of the source reference signal in the cell and/or BWP in which the target communication resource is located to be equal to $N_{start}$; otherwise, determine C to be equal to B; and
- if A is greater than $S+N_{start}-C$, determine a quantity D of resources of the source reference signal in the cell and/or BWP in which the target communication resource is located to be $S+N_{start}-C$; otherwise, determine D to be equal to A, where S is a quantity of resources of the cell and/or BWP in which the target communication resource is located.

Further, the first information includes frequency domain information of the source reference signal in the cell and/or BWP in which the target communication resource is located, and the determining module 31 is specifically configured to: in a case that a frequency domain start position $N_{start}$ of the cell and/or BWP in which the target communication resource is located is less than or equal to a preset frequency domain offset, determine a frequency domain start position of the source reference signal in the cell and/or BWP in which the target communication resource is located to be a subcarrier 0 of a common resource; otherwise, determine the frequency domain start position of the source reference signal in the cell and/or BWP in which the target communication resource is located to be a lowest subcarrier of the cell and/or BWP in which the target communication resource is located.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:
- a source reference signal in the beam information of the target communication resource configured by the network-side device;
- a source reference signal in beam information of other communication resources located in the same cell and/or BWP as the target communication resource;
- a source reference signal in beam information of other communication resources located in a different cell and/or BWP from the target communication resource;
- a common source reference signal in a preset communication resource group to which the target communication resource belongs;
- a source reference signal in beam information of other communication resources belonging to a preset communication resource group as the target communication resource;
- a source reference signal in beam information of other communication resources located in the same band as the target communication resource; and
- a source reference signal in beam information of other communication resources corresponding to same user equipment as the target communication resource.

Further, the cell and/or BWP includes at least one of the following:
- a downlink cell and/or downlink BWP in frequency division duplex mode;
- an uplink cell and/or uplink BWP in frequency division duplex mode;
- a downlink cell and/or downlink BWP in time division duplex mode; and
- an uplink cell and/or uplink BWP in time division duplex mode.

Figure 4:
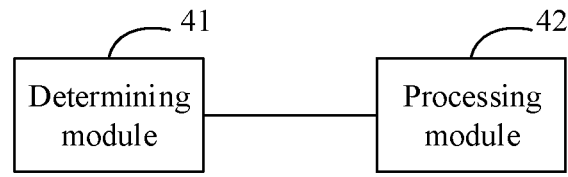
FIG. 4 is a structural block diagram of an apparatus for determining beam information applied to network-side device according to some embodiments of this disclosure.

Some embodiments of this disclosure further provide an apparatus for determining beam information, applied to a network-side device. As shown in FIG. 4, the apparatus includes:
- a determining module 41, configured to determine, based on configuration information of a target communication resource, first information of a source reference signal in a cell and/or BWP in which the target communication resource is located, where the source reference signal is associated with the target communication resource and is located in a different cell and/or BWP from the target communication resource; and
- a processing module 42, configured to determine beam information of the target communication resource based on the first information.

In this embodiment, in a case that the source reference signal and the target communication resource allocated by the network-side device are located in different cells and/or BWPs, the first information of the source reference signal in the cell and/or BWP in which the target communication resource is located is determined based on the configuration information of the target communication resource allocated by the network-side device, and the beam information of the target communication resource is determined based on the first information. In this way, for target channels or signals with no beam information configured, resource location information of a source reference signal in a cell and/or BWP in which the target channels or signals is located can be determined based on a source reference signal of other channels or signals, so as to determine beam information of the channels or signals in a case that the network-side device configures beam information not for channels or signals in all cells and/or bandwidth parts, thereby reducing signaling overheads for network configuration of beam information.

Further, the determining module is specifically configured to determine, based on second information of the source reference signal, the first information of the source reference signal in the cell and/or BWP in which the target communication resource is located, where the second information is included in the configuration information of the target communication resource or included in configuration information of other communication resources.

Further, the second information includes at least one of the following:
- a resource index of the source reference signal; and
- index information of a cell and/or BWP in which the source reference signal is located.

Further, the determining module is specifically configured to: based on the second information and third information of the source reference signal, determine the first information of the source reference signal in the cell and/or BWP in which the target communication resource is located, where the third information includes time domain and/or frequency domain information of the source reference signal.

Further, the time domain information includes a start point of a time domain resource and a quantity of time domain resources; and the frequency domain information includes a start point of the frequency domain resource and a quantity of frequency domain resources.

Further, in a case that the source reference signal is an uplink reference signal, the processing module 42 is specifically configured to: in the cell and/or BWP in which the target communication resource is located, perform beam measurement on the source reference signal based on the first information, and determine the beam information of the target communication resource based on a beam measurement result.

Further, in a case that the source reference signal is a downlink reference signal, the processing module 42 is specifically configured to: in the cell and/or BWP in which the target communication resource is located, send the source reference signal to user equipment based on the first information, and receive a beam measurement report sent by the user equipment.

Further, the configuration information includes a plurality of candidate source reference signals, and the apparatus further includes:
- an indicating module, configured to indicate, to user equipment, one source reference signal in the plurality of candidate source reference signals as a source reference signal associated with the target communication resource by using a media access control control element (MAC CE) command and/or downlink control information (DCI).

Further, the configuration information includes information about the cell and/or BWP in which the target communication resource is located.

Further, the information about the cell and/or BWP in which the target communication resource is located includes at least one of the following:
  index information of the cell and/or BWP;
  a start point of a time domain resource and a quantity of time domain resources in the cell and/or BWP; and
  a start point of a frequency domain resource and a quantity of frequency domain resources in the cell and/or BWP.

Further, the source reference signal includes at least one of the following: a synchronization signal block, a channel state information reference signal, and a sounding reference signal.

Further, the first information includes resource information of the source reference signal in the cell and/or BWP in which the target communication resource is located, and the determining module 41 is specifically configured to:
  if B is less than a resource start position $N_{start}$ of the cell and/or BWP in which the target communication resource is located, determine a resource start position C of the source reference signal in the cell and/or BWP in which the target communication resource is located to be equal to $N_{start}$; otherwise, determine C to be equal to B; and
  if A is greater than $S+N_{start}-C$, determine a quantity D of resources of the source reference signal in the cell and/or BWP in which the target communication resource is located to be $S+N_{start}-C$; otherwise, determine D to be equal to A, where S is a quantity of resources of the cell and/or BWP in which the target communication resource is located.

Further, the first information includes frequency domain information of the source reference signal in the cell and/or BWP in which the target communication resource is located, and the determining module is specifically configured to:
  in a case that a frequency domain start position $N_{start}$ of the cell and/or BWP in which the target communication resource is located is less than or equal to a preset frequency domain offset, determine a frequency domain start position of the source reference signal in the cell and/or BWP in which the target communication resource is located to be a subcarrier 0 of a common resource; otherwise, determine the frequency domain start position of the source reference signal in the cell and/or BWP in which the target communication resource is located to be a lowest subcarrier of the cell and/or BWP in which the target communication resource is located.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:
  a source reference signal in the beam information of the target communication resource configured by the network-side device;
  a source reference signal in beam information of other communication resources located in the same cell and/or BWP as the target communication resource;
  a source reference signal in beam information of other communication resources located in a different cell and/or BWP from the target communication resource;
  a common source reference signal in a preset communication resource group to which the target communication resource belongs;
  a source reference signal in beam information of other communication resources belonging to a preset communication resource group as the target communication resource;
  a source reference signal in beam information of other communication resources located in the same band as the target communication resource; and
  a source reference signal in beam information of other communication resources corresponding to same user equipment as the target communication resource.

Further, the cell and/or BWP includes at least one of the following:
  a downlink cell and/or downlink BWP in frequency division duplex mode;
  an uplink cell and/or uplink BWP in frequency division duplex mode;
  a downlink cell and/or downlink BWP in time division duplex mode; and
  an uplink cell and/or uplink BWP in time division duplex mode.

Some embodiments of this disclosure further provide a communications device, including a processor, a memory, and a program stored in the memory and capable of running on the processor. When the program is executed by the processor, the steps of the method for determining beam information described above are implemented.

The communications device may be user equipment or a network-side device.

Figure 5:
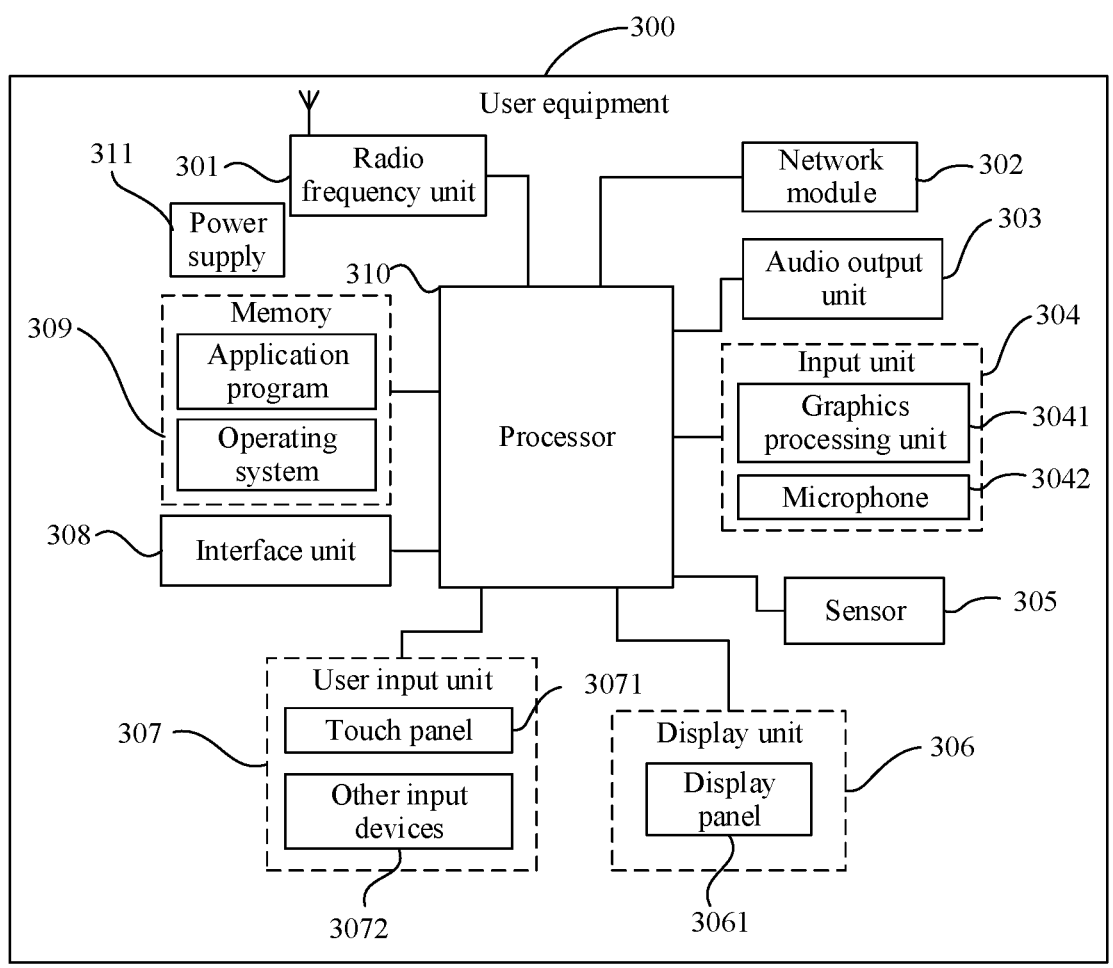
FIG. 5 is a schematic diagram of composition of user equipment according to some embodiments of this disclosure.

In a case that the communications device is user equipment, as shown in FIG. 5, the user equipment 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art understands that the user equipment structure shown in FIG. 5 does not constitute any limitation on the user equipment. The user equipment may include more or fewer components than those shown in the figure, or some components may be combined, or the components may be disposed in different manners. In this embodiment of this disclosure, the user equipment includes but is not limited to a mobile phone, a tablet computer, a laptop computer, a palmtop computer, an in-vehicle terminal, a wearable device, a pedometer, and the like.

The processor 310 is configured to determine, based on configuration information of a target communication resource, first information of a source reference signal in a cell and/or BWP in which the target communication resource is located, where the source reference signal is associated with the target communication resource and is located in a different cell and/or BWP from the target communication resource; and determining beam information of the target communication resource based on the first information.

Further, the processor 310 is further configured to: obtain second information of the source reference signal, where the second information is included in the configuration information of the target communication resource or included in configuration information of other communication resources; and determining, based on the second information, the first information of the source reference signal in the cell and/or BWP in which the target communication resource is located.

Further, the second information includes at least one of the following:
a resource index of the source reference signal; and
index information of a cell and/or BWP in which the source reference signal is located.

The processor 310 is further configured to: obtain third information of the source reference signal, where the third information includes time domain and/or frequency domain information of the source reference signal; and determine, based on the second information and the third information, the first information of the source reference signal in the cell and/or BWP in which the target communication resource is located.

Further, the time domain information includes a start point of a time domain resource and a quantity of time domain resources; and the frequency domain information includes a start point of the frequency domain resource and a quantity of frequency domain resources.

Further, in a case that the source reference signal is a downlink reference signal, the processor 310 is further configured to: in the cell and/or BWP in which the target communication resource is located, perform beam measurement on the source reference signal based on the first information, and send a beam measurement report to a network-side device.

Further, in a case that the source reference signal is an uplink reference signal, the processor 310 is specifically configured to send the source reference signal to a network-side device in the cell and/or BWP in which the target communication resource is located.

Further, the configuration information includes a plurality of candidate source reference signals, and the processor 310 is further configured to determine one source reference signal in the plurality of candidate source reference signals as a source reference signal associated with the target communication resource based on a media access control control element (MAC CE) command and/or downlink control information (DCI) of the network-side device.

Further, after the beam information of the target communication resource is determined, the processor 310 is further configured to: determine a transmit beam or receive beam of the target communication resource based on the beam information.

Further, the configuration information includes information about the cell and/or BWP in which the target communication resource is located.

Further, the information about the cell and/or BWP in which the target communication resource is located includes at least one of the following:
index information of the cell and/or BWP;
a start point of a time domain resource and a quantity of time domain resources in the cell and/or BWP; and
a start point of a frequency domain resource and a quantity of frequency domain resources in the cell and/or BWP.

Further, the source reference signal includes at least one of the following: a synchronization signal block, a channel state information reference signal, and a sounding reference signal.

Further, the first information includes resource information of the source reference signal in the cell and/or BWP in which the target communication resource is located, and the configuration information includes a resource quantity A and a resource start position B that are of the source reference signal; and the processor 310 is specifically configured to: if B is less than a resource start position $N_{start}$ of the cell and/or BWP in which the target communication resource is located, determine a resource start position C of the source reference signal in the cell and/or BWP in which the target communication resource is located to be equal to $N_{start}$; otherwise, determine C to be equal to B; and if A is greater than $S+N_{start}-C$, determine a quantity D of resources of the source reference signal in the cell and/or BWP in which the target communication resource is located to be $S+N_{start}-C$; otherwise, determine D to be equal to A, where S is a quantity of resources of the cell and/or BWP in which the target communication resource is located.

Further, the first information includes frequency domain information of the source reference signal in the cell and/or BWP in which the target communication resource is located, and the processor 310 is specifically configured to: in a case that a frequency domain start position $N_{start}$ of the cell and/or BWP in which the target communication resource is located is less than or equal to a preset frequency domain offset, determine a frequency domain start position of the source reference signal in the cell and/or BWP in which the target communication resource is located to be a subcarrier 0 of a common resource; otherwise, determine the frequency domain start position of the source reference signal in the cell and/or BWP in which the target communication resource is located to be a lowest subcarrier of the cell and/or BWP in which the target communication resource is located.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:
a source reference signal in the beam information of the target communication resource configured by the network-side device;
a source reference signal in beam information of other communication resources located in the same cell and/or BWP as the target communication resource;
a source reference signal in beam information of other communication resources located in a different cell and/or BWP from the target communication resource;
a common source reference signal in a preset communication resource group to which the target communication resource belongs;
a source reference signal in beam information of other communication resources belonging to a preset communication resource group as the target communication resource;
a source reference signal in beam information of other communication resources located in the same band as the target communication resource; and
a source reference signal in beam information of other communication resources corresponding to same user equipment as the target communication resource.

Further, the cell and/or BWP includes at least one of the following:
a downlink cell and/or downlink BWP in frequency division duplex mode;

an uplink cell and/or uplink BWP in frequency division duplex mode;
a downlink cell and/or downlink BWP in time division duplex mode; and
an uplink cell and/or uplink BWP in time division duplex mode.

It should be understood that in some embodiments of the present disclosure, the radio frequency unit 301 may be configured to: receive and send signals in an information receiving/sending process or a call process; and specifically, after receiving downlink data from a base station, send the downlink data to the processor 310 for processing, and in addition, send uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal device provides a user with wireless broadband internet access through the network module 302, for example, helping the user to transmit and receive e-mails, browse web pages, and access streaming media.

The audio output unit 303 may convert audio data received by the radio frequency unit 301 or the network module 302 or stored in the memory 309 into an audio signal and output the audio signal as a sound. Furthermore, the audio output unit 303 may also provide audio output (for example, a call signal received sound or a message received sound) related to a specific function performed by the terminal device 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or video obtained by an image capture apparatus (such as a camera) in a video capture mode or an image capture mode. A processed image frame may be displayed on the display unit 306. The image frame processed by the graphics processing unit 3041 may be stored in the memory 309 (or another storage medium) or be transmitted by the radio frequency unit 301 or the network module 302. The microphone 3042 is capable of receiving sounds and processing such sounds into audio data. The processed audio data may be converted in a telephone call mode into a format that can be transmitted by the radio frequency unit 301 to a mobile communications base station, for outputting.

The terminal device 300 may further include at least one sensor 305, for example, an optical sensor, a motion sensor, and other sensors. Specifically, the optical sensor may include an ambient light sensor and a proximity sensor. The ambient light sensor may adjust luminance of the display panel 3031 based on brightness of ambient light, and the proximity sensor may turn off the display panel 3031 and/or backlight when the terminal device 300 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the user equipment, functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include a display panel 3031, and the display panel 3031 may be configured in a form of a liquid crystal display (LCD), an organic light-emitting diode (OLED), or the like.

The user input unit 307 may be configured to receive input digit or character information and generate key signal input related to user setting and function control of the user equipment. Specifically, the user input unit 307 may include a touch panel 3071 and other input devices 3072. The touch panel 3071 is also referred to as a touchscreen and can collect a touch operation (such as an operation performed by the user on the touch panel 3071 or near the touch panel 3071 with a finger or by using any proper object or accessory such as a stylus) of the user on or near the touch panel 3071. The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 310, and can receive a command transmitted by the processor 310 and execute the command. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (such as a volume control key or an on/off key), a trackball, a mouse, and a joystick. Details are not described herein.

Further, the touch panel 3071 may cover the display panel 3031. When detecting a touch operation on or near the touch panel 3071, the touch panel 3071 transmits the touch operation to the processor 310 to determine a type of a touch event. Then, the processor 310 provides a corresponding visual output on the display panel 3031 based on the type of the touch event. Although in FIG. 6, the touch panel 3071 and the display panel 3031 act as two independent parts to implement input and output functions of the user equipment, in some embodiments, the touch panel 3071 and the display panel 3031 may be integrated to implement the input and output functions of the user equipment. This is not specifically limited herein.

The interface unit 308 is an interface between an external apparatus and the terminal device 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to receive an input (for example, data information or power) from an external apparatus and transmit the received input to one or more elements within the user equipment 300, or may be configured to transmit data between the user equipment 300 and the external apparatus.

The memory 309 may be configured to store software programs and various data. The memory 309 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 309 may include a high-speed random access memory, and may further include a non-volatile memory such as at least one disk storage device, a flash memory device, or another volatile solid-state storage device.

The processor 310 is a control center of the terminal device, uses various interfaces and lines to connect parts of the entire terminal device, and executes various functions and processing data of the terminal device by running or executing software programs and/or modules stored in the memory 309 and invoking data stored in the memory 309, so as to perform overall monitoring on the terminal device. The processor 310 may include one or more processing units. Optionally, an application processor and a modem processor may be integrated in the processor 310. The application processor primarily processes an operating system, user interfaces, application programs, and the like. The modem processor primarily processes radio communication. It can be understood that the modem processor may alternatively be not integrated in the processor 310. The terminal device 300 may further include a power supply 311 (such as a battery) that supplies power to components. Optionally, the power supply 311 may be logically connected to the processor 310 through a power management system. In this way, functions such as charge management, discharge management, and power consumption management are implemented by using the power management system.

In addition, the terminal device 300 includes some functional modules that are not shown. Details are not described herein.

Figure 6:
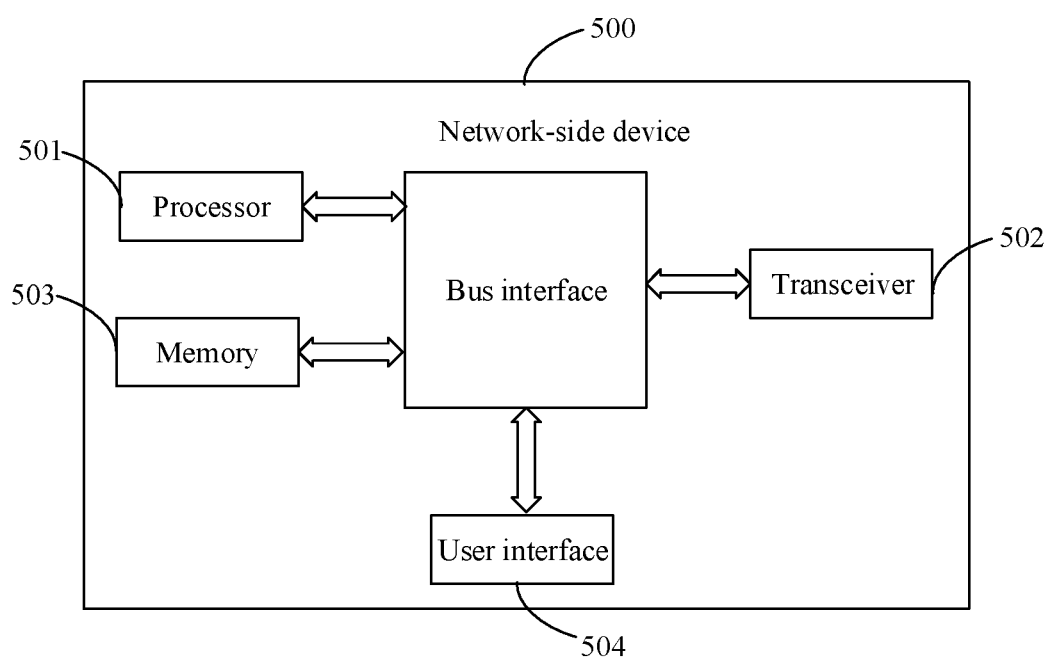
FIG. 6 is a schematic diagram of composition of a network-side device according to some embodiments of this disclosure.

In a case that the communications device is a network-side device, as shown in FIG. 6, the network-side device 500 includes a processor 501, a transceiver 502, a memory 503, a user interface 504, and a bus interface.

In some embodiments of this disclosure, the network-side device 500 further includes: a program stored in the memory 503 and capable of running on the processor 501. When the program is executed by the processor 501, the following steps are implemented: determine, based on configuration information of a target communication resource, first information of a source reference signal in a cell and/or BWP in which the target communication resource is located, where the source reference signal is associated with the target communication resource and is located in a different cell and/or BWP from the target communication resource; and
  determine beam information of the target communication resource based on the first information.

In FIG. 6, a bus architecture may include any quantity of interconnected buses and bridges, specifically for interconnecting various circuits of one or more processors represented by the processor 501 and a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of components, that is, the transceiver 502 includes a transmitter and a receiver, and provides a unit for communicating with various other apparatuses on a transmission medium. For different user equipments, the user interface 504 may also be an interface that can be externally or internally connected to a required device. The connected device includes but is not limited to a keypad, a display, a speaker, a microphone, a joystick, and the like.

The processor 501 is responsible for management of the bus architecture and general processing, and the memory 503 is capable of storing data that is used by the processor 501 during operation.

Further, the processor 501 is further configured to determine, based on second information of the source reference signal, the first information of the source reference signal in the cell and/or BWP in which the target communication resource is located, where the second information is included in the configuration information of the target communication resource or included in configuration information of other communication resources.

Further, the second information includes at least one of the following:
  a resource index of the source reference signal; and
  index information of a cell and/or BWP in which the source reference signal is located.

Further, the processor 501 is specifically configured to: based on the second information and third information of the source reference signal, determine the first information of the source reference signal in the cell and/or BWP in which the target communication resource is located, where the third information includes time domain and/or frequency domain information of the source reference signal.

Further, the time domain information includes a start point of a time domain resource and a quantity of time domain resources; and the frequency domain information includes a start point of the frequency domain resource and a quantity of frequency domain resources.

The foregoing resource includes but is not limited to a resource block.

Further, in a case that the source reference signal is an uplink reference signal, the processor 501 is specifically configured to: in the cell and/or BWP in which the target communication resource is located, perform beam measurement on the source reference signal based on the first information, and determine the beam information of the target communication resource based on a beam measurement result.

Further, in a case that the source reference signal is a downlink reference signal, the processor 501 is specifically configured to: in the cell and/or BWP in which the target communication resource is located, send the source reference signal to user equipment based on the first information, and receive a beam measurement report sent by the user equipment.

Further, the configuration information includes a plurality of candidate source reference signals, and the processor 501 is further configured to indicate, to user equipment, one source reference signal in the plurality of candidate source reference signals as a source reference signal associated with the target communication resource by using a media access control control element (MAC CE) command and/or downlink control information (DCI).

Further, the configuration information includes information about the cell and/or BWP in which the target communication resource is located.

Further, the information about the cell and/or BWP in which the target communication resource is located includes at least one of the following:
  index information of the cell and/or BWP;
  a start point of a time domain resource and a quantity of time domain resources in the cell and/or BWP; and a start point of a frequency domain resource and a quantity of frequency domain resources in the cell and/or BWP.

The foregoing resource includes but is not limited to a resource block.

Further, the source reference signal includes at least one of the following: a synchronization signal block, a channel state information reference signal, and a sounding reference signal. Further, the first information includes resource information of the source reference signal in the cell and/or BWP in which the target communication resource is located, and the configuration information includes a resource quantity A and a resource start position B that are of the source reference signal; and the processor 501 is specifically configured to: if B is less than a resource start position $N_{start}$ of the cell and/or BWP in which the target communication resource is located, determine a resource start position C of the source reference signal in the cell and/or BWP in which the target communication resource is located to be equal to $N_{start}$; otherwise, determine C to be equal to B; and if A is greater than $S+N_{start}-C$, determine a quantity D of resources of the source reference signal in the cell and/or BWP in which the target communication resource is located to be $S+N_{start}-C$; otherwise, determine D to be equal to A, where S is a quantity of resources of the cell and/or BWP in which the target communication resource is located.

Further, the first information includes frequency domain information of the source reference signal in the cell and/or BWP in which the target communication resource is located, and the processor 501 is specifically configured to: in a case that a frequency domain start position $N_{start}$ of the cell and/or BWP in which the target communication resource is located is less than or equal to a preset frequency domain offset, determine a frequency domain start position of the source reference signal in the cell and/or BWP in which the target communication resource is located to be a subcarrier 0 of a common resource; otherwise, determine the frequency domain start position of the source reference signal in the cell and/or BWP in which the target communication resource is located to be a lowest subcarrier of the cell and/or BWP in which the target communication resource is located.

Further, the target communication resource includes a target channel and/or a target reference signal.

Further, the beam information includes at least one of the following: spatial relation information, transmission configuration indicator state (TCI state) information, and quasi co-location (QCL) information.

Further, the source reference signal associated with the target communication resource includes at least one of the following:

a source reference signal in the beam information of the target communication resource configured by the network-side device;

a source reference signal in beam information of other communication resources located in the same cell and/or BWP as the target communication resource;

a source reference signal in beam information of other communication resources located in a different cell and/or BWP from the target communication resource;

a common source reference signal in a preset communication resource group to which the target communication resource belongs;

a source reference signal in beam information of other communication resources belonging to a preset communication resource group as the target communication resource;

a source reference signal in beam information of other communication resources located in the same band as the target communication resource; and a source reference signal in beam information of other communication resources corresponding to same user equipment as the target communication resource.

Further, the cell and/or BWP includes at least one of the following:

a downlink cell and/or downlink BWP in frequency division duplex mode;

an uplink cell and/or uplink BWP in frequency division duplex mode;

a downlink cell and/or downlink BWP in time division duplex mode; and an uplink cell and/or uplink BWP in time division duplex mode.

Some embodiments of this disclosure further provide a computer-readable storage medium, where a computer program is stored in the computer-readable storage medium, and when the computer program is executed by a processor, the steps of the foregoing method for determining beam information are implemented.

It may be understood that the embodiments described in this specification may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

For software implementation, the techniques described in this specification may be implemented by modules (such as processes and functions) that perform the functions described in this specification. Software code may be stored in the memory and executed by the processor. The memory may be implemented in or outside the processor.

All the embodiments in this specification are described in a progressive manner. Each embodiment focuses on differences from other embodiments. For the part that is the same or similar between different embodiments, reference may be made between the embodiments.

A person skilled in the art should understand that some embodiments of this disclosure may be provided as a method, an apparatus, or a computer program product. Therefore, some embodiments of this disclosure may use a form of hardware only embodiments, software only embodiments, or embodiments with a combination of software and hardware. Moreover, some embodiments of this disclosure may use a form of a computer program product that is implemented on one or more computer-usable storage media (including but not limited to a disk memory, a CD-ROM, an optical memory, and the like) that include computer-usable program code.

Some embodiments of this disclosure are described with reference to the flowcharts and/or block diagrams of the method, the user equipment (system), and the computer program product according to some embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may be stored in a computer-readable memory that can instruct the computer or any other programmable data processing user equipment to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing user equipment, so that a series of operations and steps are performed on the computer or the another programmable user equipment, thereby generating computer-implemented processing. Therefore, the instructions executed on the computer or the another programmable user equipment provide steps for implementing a specific function in one or more processes in the flowcharts and/or in one or more blocks in the block diagrams.

Although some optional embodiments in some embodiments of this disclosure have been described, persons skilled in the art can make changes and modifications to these embodiments once they learn the basic inventive concept. Therefore, the following claims are intended to be construed as to cover the preferred embodiments and all changes and modifications falling within the scope of some embodiments of this disclosure.

It should be further noted that in this specification, relational terms such as first and second are used only to differentiate an entity or operation from another entity or operation, and do not require or imply that any actual relationship or sequence exists between these entities or operations. Moreover, the terms "include", "comprise", or any of their variants is intended to cover a non-exclusive inclusion, such that a process, a method, an article, or user equipment that includes a list of elements not only includes those elements but also includes other elements which are not expressly listed, or further includes elements inherent to such process, method, article, or user equipment. An element preceded by "includes a . . . " does not, without more constraints, preclude the existence of additional identical elements in the process, method, article, or user equipment that includes the element.

The foregoing descriptions are optional implementations of this disclosure. It should be noted that a person of ordinary skill in the art may make several improvements and polishing without departing from the principle described in this disclosure and the improvements and polishing shall fall within the protection scope of this disclosure.

What is claimed is:

1. A method for determining beam information comprising:
   determining, by user equipment based on configuration information of a target communication resource, first information of a source reference signal in a cell and/or bandwidth part (BWP) in which the target communication resource is located, wherein the source reference signal is associated with the target communication resource and is located in a different cell and/or BWP from the target communication resource; and
   determining, by the user equipment, beam information of the target communication resource based on the first information;
   wherein the first information comprises resource information of the source reference signal in the cell and/or BWP in which the target communication resource is located, and the configuration information comprises a resource quantity A and a resource start position B that are of the source reference signal; and the determining, based on configuration information of a target communication resource, first information of a source reference signal in a cell and/or bandwidth part (BWP) in which the target communication resource is located comprises:
   if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and
   if A is greater than $S+N_{start}-C$, determining a quantity D of resources of the source reference signal in the cell and/or BWP in which the target communication resource is located to be $S+N_{start}-C$; otherwise, determining D to be equal to A, wherein S is a quantity of resources of the cell and/or BWP in which the target communication resource is located.

2. The method for determining beam information according to claim 1, further comprising:
   obtaining second information of the source reference signal, wherein the second information is comprised in the configuration information of the target communication resource or comprised in configuration information of other communication resources; wherein
   the determining first information comprises:
   determining, based on the second information, the first information of the source reference signal in the cell and/or BWP in which the target communication resource is located.

3. The method for determining beam information according to claim 2, wherein the second information comprises at least one of the following:
   a resource index of the source reference signal; or
   index information of a cell and/or BWP in which the source reference signal is located.

4. The method for determining beam information according to claim 2, further comprising:
   obtaining third information of the source reference signal, wherein the third information comprises time domain and/or frequency domain information of the source reference signal; wherein
   the determining first information comprises:
   determining, based on the second information and the third information, the first information of the source reference signal in the cell and/or BWP in which the target communication resource is located.

5. The method for determining beam information according to claim 4, wherein the time domain information comprises a start point of a time domain resource and a quantity of time domain resources; and the frequency domain information comprises a start point of the frequency domain resource and a quantity of frequency domain resources.

6. The method for determining beam information according to claim 1, wherein in a case that the source reference signal is a downlink reference signal, the determining beam information of the target communication resource based on the first information comprises:

in the cell and/or BWP in which the target communication resource is located, performing beam measurement on the source reference signal based on the first information, and sending a beam measurement report to a network-side device.

7. The method for determining beam information according to claim 1, wherein in a case that the source reference signal is an uplink reference signal, the determining beam information of the target communication resource based on the first information comprises:

sending the source reference signal to a network-side device in the cell and/or BWP in which the target communication resource is located.

8. The method for determining beam information according to claim 1, wherein the configuration information comprises a plurality of candidate source reference signals, and the method further comprises:

determining one source reference signal in the plurality of candidate source reference signals as a source reference signal associated with the target communication resource based on a media access control control element (MAC CE) command and/or downlink control information (DCI) of a network-side device.

9. The method for determining beam information according to claim 1, wherein after the determining beam information of the target communication resource, the method further comprises:

determining a transmit beam or receive beam of the target communication resource based on the beam information.

10. The method for determining beam information according to claim 1, wherein the configuration information comprises information about the cell and/or BWP in which the target communication resource is located.

11. The method for determining beam information according to claim 10, wherein the information about the cell and/or BWP in which the target communication resource is located comprises at least one of the following:

index information of the cell and/or BWP;
a start point of a time domain resource and a quantity of time domain resources in the cell and/or BWP; or
a start point of a frequency domain resource and a quantity of frequency domain resources in the cell and/or BWP.

12. The method for determining beam information according to claim 1, wherein the source reference signal comprises at least one of the following: a synchronization signal block, a channel state information reference signal, or a sounding reference signal.

13. The method for determining beam information according to claim 1, wherein the first information comprises frequency domain information of the source reference signal in the cell and/or BWP in which the target communication resource is located, and the determining, based on configuration information of a target communication resource, first information of a source reference signal in a cell and/or bandwidth part (BWP) in which the target communication resource is located comprises:

in a case that a frequency domain start position $N_{start}$ of the cell and/or BWP in which the target communication resource is located is less than or equal to a preset frequency domain offset, determining a frequency domain start position of the source reference signal in the cell and/or BWP in which the target communication resource is located to be a subcarrier 0 of a common resource; otherwise, determining the frequency domain start position of the source reference signal in the cell and/or BWP in which the target communication resource is located to be a lowest subcarrier of the cell and/or BWP in which the target communication resource is located.

14. The method for determining beam information according to claim 1, wherein the target communication resource comprises a target channel and/or a target reference signal.

15. The method for determining beam information according to claim 1, wherein the beam information comprises at least one of the following: spatial relation information, transmission configuration indicator state (TCI state) information, or quasi co-location (QCL) information.

16. The method for determining beam information according to claim 1, wherein the source reference signal associated with the target communication resource comprises at least one of the following:

a source reference signal in the beam information of the target communication resource configured by a network-side device;
a source reference signal in beam information of other communication resources located in the same cell and/or BWP as the target communication resource;
a source reference signal in beam information of other communication resources located in a different cell and/or BWP from the target communication resource;
a common source reference signal in a preset communication resource group to which the target communication resource belongs;
a source reference signal in beam information of other communication resources belonging to a preset communication resource group as the target communication resource;
a source reference signal in beam information of other communication resources located in the same band as the target communication resource; or
a source reference signal in beam information of other communication resources corresponding to same user equipment as the target communication resource.

17. The method for determining beam information according to claim 1, wherein the cell and/or BWP comprises at least one of the following:

a downlink cell and/or downlink BWP in frequency division duplex mode;
an uplink cell and/or uplink BWP in frequency division duplex mode;
a downlink cell and/or downlink BWP in time division duplex mode; or
an uplink cell and/or uplink BWP in time division duplex mode.

18. User equipment, comprising a memory, a processor, and a program stored in the memory and capable of running on the processor, wherein when the program is executed by the processor, following steps are implemented:

determining, based on configuration information of a target communication resource, first information of a source reference signal in a cell and/or bandwidth part (BWP) in which the target communication resource is located, wherein the source reference signal is associated with the target communication resource and is located in a different cell and/or BWP from the target communication resource; and
determining beam information of the target communication resource based on the first information;

wherein the first information comprises resource information of the source reference signal in the cell and/or BWP in which the target communication resource is located, and the configuration information comprises a resource quantity A and a resource start position B that are of the source reference signal; and the determining, based on configuration information of a target communication resource, first information of a source reference signal in a cell and/or bandwidth part (BWP) in which the target communication resource is located comprises:

if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and if A is greater than $S+N_{start}-C$, determining a quantity D of resources of the source reference signal in the cell and/or BWP in which the target communication resource is located to be $S+N_{start}-C$; otherwise, determining D to be equal to A, wherein S is a quantity of resources of the cell and/or BWP in which the target communication resource is located.

19. A network-side device, comprising a memory, a processor, and a program stored in the memory and capable of running on the processor, wherein when the program is executed by the processor, following steps are implemented:

determining, based on configuration information of a target communication resource, first information of a source reference signal in a cell and/or BWP in which the target communication resource is located, wherein the source reference signal is associated with the target communication resource and is located in a different cell and/or BWP from the target communication resource; and determining beam information of the target communication resource based on the first information;

wherein the first information comprises resource information of the source reference signal in the cell and/or BWP in which the target communication resource is located, and the configuration information comprises a resource quantity A and a resource start position B that are of the source reference signal; and the determining, based on configuration information of a target communication resource, first information of a source reference signal in a cell and/or BWP in which the target communication resource is located comprises:

if B is less than a resource start position $N_{start}$ of the cell and/or BWP in which the target communication resource is located, determining a resource start position C of the source reference signal in the cell and/or BWP in which the target communication resource is located to be equal to $N_{start}$; otherwise, determining C to be equal to B; and if A is greater than $S+N_{start}-C$, determining a quantity D of resources of the source reference signal in the cell and/or BWP in which the target communication resource is located to be $S+N_{start}-C$; otherwise, determining D to be equal to A, wherein S is a quantity of resources of the cell and/or BWP in which the target communication resource is located.

* * * * *